US008332294B1

(12) United States Patent
Thearling

(10) Patent No.: US 8,332,294 B1
(45) Date of Patent: Dec. 11, 2012

(54) METHOD AND SYSTEM FOR COLLECTING AND MANAGING FEEDBACK FROM ACCOUNT USERS VIA ACCOUNT STATEMENTS

(75) Inventor: Kurt Thearling, Glen Allen, VA (US)

(73) Assignee: Capital One Financial Corporation, McLean, VA (US)

( * ) Notice: Subject to any disclaimer, the term of this patent is extended or adjusted under 35 U.S.C. 154(b) by 349 days.

(21) Appl. No.: 12/061,198

(22) Filed: Apr. 2, 2008

(51) Int. Cl.
*G06Q 40/00* (2012.01)
(52) U.S. Cl. .......................................... 705/35; 705/347
(58) Field of Classification Search ................. 705/35, 705/347
See application file for complete search history.

(56) References Cited

U.S. PATENT DOCUMENTS

| | | | |
|---|---|---|---|
| 7,013,285 B1 * | 3/2006 | Rebane ......................... 705/7.31 |
| 7,174,306 B1 * | 2/2007 | Haseltine .................... 705/26.35 |
| 7,428,505 B1 * | 9/2008 | Levy et al. ........................ 705/37 |
| 7,634,428 B1 * | 12/2009 | Varatharajah ................ 705/26.8 |
| 2001/0044729 A1 | 11/2001 | Pomerance |
| 2003/0158844 A1 | 8/2003 | Kramer et al. |
| 2003/0220807 A1 * | 11/2003 | Hoffman et al. .................... 705/1 |
| 2004/0162778 A1 | 8/2004 | Kramer et al. |
| 2005/0027612 A1 | 2/2005 | Walker et al. |
| 2005/0071223 A1 | 3/2005 | Jain et al. |
| 2005/0256809 A1 * | 11/2005 | Sadri ............................... 705/78 |
| 2007/0078699 A1 | 4/2007 | Scott et al. |
| 2007/0220540 A1 | 9/2007 | Walker et al. |

OTHER PUBLICATIONS

Minder Chen, & Yihwa Irene Liou. (2002). Building a knowledge-enabled electronic commerce environment. The Journal of Computer Information Systems: Special Issue, 42(5), 95-101. Retrieved Aug. 6, 2012.*
Shopzilla Business Services: "Customer Ratings by BizRate" Retrieved from the Internet on Aug. 25, 2008 at <http://merchant.shopzilla.com/oa/customer_ratings/> 2 pages.
Shopzilla—Product Reviews and Price Comparison: "Store Ratings", Retrieved from the Internet on Aug. 25, 2008 at <http://www.1.shopzilla.com/42_-_content--ratings_guide> 7 pages.
Amazon.com Home Page: Retrieved from the Internet on Aug. 25, 2008 at <http://www.amazon.com/gp/help/customer/display.html?nodeId=537774> 8 pages.
Ebay: "Feedback—Overview", Retrieved from the Internet on Aug. 25, 2008 at <http://pages.ebay.com/help/feedback.html> 3 pages.

* cited by examiner

*Primary Examiner* — Kito R Robinson
(74) *Attorney, Agent, or Firm* — Hunton & Williams LLP

(57) ABSTRACT

A method and system for collecting and managing feedback from account users via account statements by providing data for a user interface displaying a statement of financial transactions and one or more feedback mechanisms, receiving feedback information via a selected feedback mechanism, and storing the received feedback information and feedback information received from other users. Authorization information for a desired financial transaction that is dependent, at least in part, on the received feedback information, may also be provided.

21 Claims, 9 Drawing Sheets

FIG. 2

John Doe's Platinum Account (1234 1234 1234 1234) — 202
Statement for January 1, 2008 to January 31, 2008 — 203

Logout
Set Alerts
Set Feedback Restrictions

| Previous Balance | Payments & Credits | Finance Charge | Transactions | New Balance | Minimum Payment |
|---|---|---|---|---|---|
| $118.83 | - $118.83 | + $0.00 | + $277.09 | = $277.09 | $50.00 |

Account Information

| | |
|---|---|
| TOTAL CREDIT LINE | $5,000.00 |
| TOTAL AVAILABLE CREDIT | $4,722.91 |
| CREDIT LINE FOR CASH | $2,500.00 |
| AVAILABLE CREDIT FOR CASH | $2,500.00 |

Payments

| | Date | Description | Amount |
|---|---|---|---|
| 1 | 1/17/2008 | Payment | $118.83 |

Transactions

| | Date | Feedback | Description | Amount |
|---|---|---|---|---|
| 1 | 1/19/2008 | ◆ □ ◀ (Review) | NEWSPAPER SUBSCRIPTION | $112.14 |
| 2 | 1/20/2008 | ◆ □ ◀ (Review) | XYZ RESTAURANT ★★★ | $89.65 |
| 3 | 1/22/2008 | ◆ □ ◀ (Review) | ABC HARDWARE ★ | $12.55 |
| | | | 🔨 Hammer (Rate Product) | |
| 4 | 1/27/2008 | ◆ □ ◀ (Review) | XYZ RESTAURANT ★★★ | $62.75 |

Finance Charges

| | Balance | Periodic Rate | Corresponding APR | FINANCE CHARGE |
|---|---|---|---|---|
| Purchases | $0.00 | 0.04145%F | 15.13% | $0.00 |
| Cash | $0.00 | 0.05762%F | 21.03% | $0.00 |

FIG. 3

John Doe's Platinum Account (1234 1234 1234 1234)

View Merchant Feedback – ABC Hardware

Sort by: Most Recent ▼
Time: Last 30 Days ▼
Amount: Transactions < $1000 ▼

Feedback Choices
CHOOSE MERCHANT
CHOOSE PRODUCT
CHOOSE TRANSACTION
VIEW YOUR REVIEWS

| Date | Customer | Amount | Rating | Review |
|---|---|---|---|---|
| 2/1/08 | John12 | $163.44 | ★★★★ | |
| 1/25/08 | User1 | $92.78 | ★ | Prices too high. |
| 1/22/08 | John12 | $12.55 | ★★ | Average service. |
| 1/14/08 | Jane345 | $594.37 | ★★★★ | Very helpful staff. |

FIG. 4

Merchant Feedback Table

| | 1 | 2 | 3 | 4 |
|---|---|---|---|---|
| Entry Number | 1 | | | |
| Merchant Name | ABC Hardware | | | |
| Merchant ID | 1234567890 | | | |
| Merchant Group | Retail – Hardware | | | |
| Merchant Location | Region 4 | | | |
| Product ID | 036000291452 | | | |
| Customer Account Number | 1234 1234 1234 1234 | | | |
| Transaction ID | 098abc765def432 | | | |
| Feedback Rating | 2 | | | |
| Feedback Text | "Average service." | | | |
| Date of Feedback | 1/22/08 9:00 AM | | | |

FIG. 5

Product Feedback Table

| | 1 | 2 | 3 | 4 |
|---|---|---|---|---|
| Entry Number | 1 | | | |
| Product Name | Hammer | | | |
| Product ID | 036000291452 | | | |
| Product Category | Retail | | | |
| Product Subcategory | Home Improvement | | | |
| Merchant ID | 1234567890 | | | |
| Customer Account Number | 1234 1234 1234 1234 | | | |
| Transaction ID | 098abc765def432 | | | |
| Feedback Rating | 5 | | | |
| Feedback Text | "Great product." | | | |
| Date of Feedback | 1/2/08 2:00 PM | | | |

FIG. 9

Alert and Authorization/Restriction Table

| | 1 | 2 | 3 | 4 |
|---|---|---|---|---|
| 901 Entry Number | 1 | | | |
| 902 Customer Name | John Doe | | | |
| 903 Customer Address | 11 Main Street | | | |
| 904 Customer Phone Number | (123) 456-7890 | | | |
| 905 Customer E-mail Address | doe@email.com | | | |
| 906 Account Type | Credit (Rate Level 3) | | | |
| 907 Account Number | 1234 1234 1234 1234 | | | |
| 908 Expiration Date | 9/1/09 | | | |
| 909 Card Association | ABC Issuer (000001) | | | |
| 910 Status | Restriction | | | |
| 911 Merchant Rating Level | | | | |
| 912 Product Rating Level | 2 | | | |
| 913 Begin Time | 1/1/08 9:00 AM | | | |
| 914 End Time | 1/1/09 9:00 AM | | | |
| 915 Instructions | All Transactions | | | |

METHOD AND SYSTEM FOR COLLECTING AND MANAGING FEEDBACK FROM ACCOUNT USERS VIA ACCOUNT STATEMENTS

FIELD OF THE INVENTION

The present invention relates to a method and system for collecting and managing feedback from account users via account statements.

BACKGROUND OF THE INVENTION

As the number of merchants with which customers can do business continues to expand, particularly those merchants offering products and services online, customers often do not know which ones they can trust. Customers frequently rely on the opinions of friends, colleagues, and other acquaintances to decide what products they should buy or what merchants they should buy from, but such information may not always be available. For example, a customer considering buying a specific product may not know anyone else who purchased that product. Further, it may be more valuable for the customer to have feedback from a broader group of individuals. If a particular merchant is well known among a large group of people to offer inadequate products or poor service, for example, a customer may think twice before buying from that merchant. Similarly, the good reputation of a merchant among a large group of people may be more valuable to a customer than the opinion of just one or two individuals. Customers may lack a quick and easy way to provide and access such feedback, however.

These and other drawbacks exist with current systems.

SUMMARY OF THE INVENTION

Various exemplary embodiments provide for collecting and managing feedback from account users via account statements. A customer may establish one or more financial accounts with an account provider and receive an associated card, such as a credit card, that the customer may use to make purchases or perform other financial transactions. The account provider may periodically provide the customer with a user interface displaying a statement of financial transactions performed using the account, such as a credit card billing statement for a credit account. The customer may then view the statement, verify that there are no incorrect or potentially fraudulent charges, and pay a bill for any unpaid balances. The statement may also include a mechanism for the customer to provide feedback about a merchant, product, service, or transaction in the statement. The feedback may be stored with feedback from other customers and later provided to customers for their own use. In that way, the account provider may help its customers obtain helpful information about merchants, products, services, and transactions by collecting and sharing feedback given by other customers during the typical customer action of viewing a financial statement.

Various exemplary embodiments may provide a method for collecting and managing feedback from account users via account statements. Data may be provided for a user interface displaying a statement of financial transactions each performed with a particular merchant. One or more feedback mechanisms each associated with one of the financial transactions and the respective merchant may also be provided. Feedback information may be received via a selected feedback mechanism and stored along with feedback information received from other customers. The feedback information may comprise information regarding the merchant associated with the selected feedback mechanism or information regarding a product or service purchased in the respective transaction, for example. Feedback information may also be used to authorize and restrict financial transactions or to alert a customer. Feedback information collected from customers may also be provided and/or sold to other entities.

Various exemplary embodiments may also provide a system for collecting and managing feedback from account users via account statements, including a user interface module for providing data for a user interface displaying a statement of financial transactions and one or more feedback mechanisms. The system may also include a feedback module to receive feedback information via a selected feedback mechanism, as well as a transaction processing module and an authorization module for acting on subsequent authorization requests for attempted transactions.

Other embodiments are also within the scope of the invention.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which:

FIG. 2 depicts an exemplary user interface for collecting and managing feedback from account users via account statements according to various embodiments of the disclosure;

FIG. 3 depicts an exemplary user interface for collecting and managing feedback from account users via account statements according to various embodiments of the disclosure;

FIG. 4 depicts an exemplary database table for use in collecting and managing feedback from account users via account statements according to various embodiments of the disclosure;

FIG. 5 depicts an exemplary database table for use in collecting and managing feedback from account users via account statements according to various embodiments of the disclosure;

FIG. 9 depicts an exemplary database table for use in collecting and managing feedback from account users via account statements according to various embodiments of the disclosure.

DETAILED DESCRIPTION OF EXEMPLARY EMBODIMENT(S)

Figure 1:
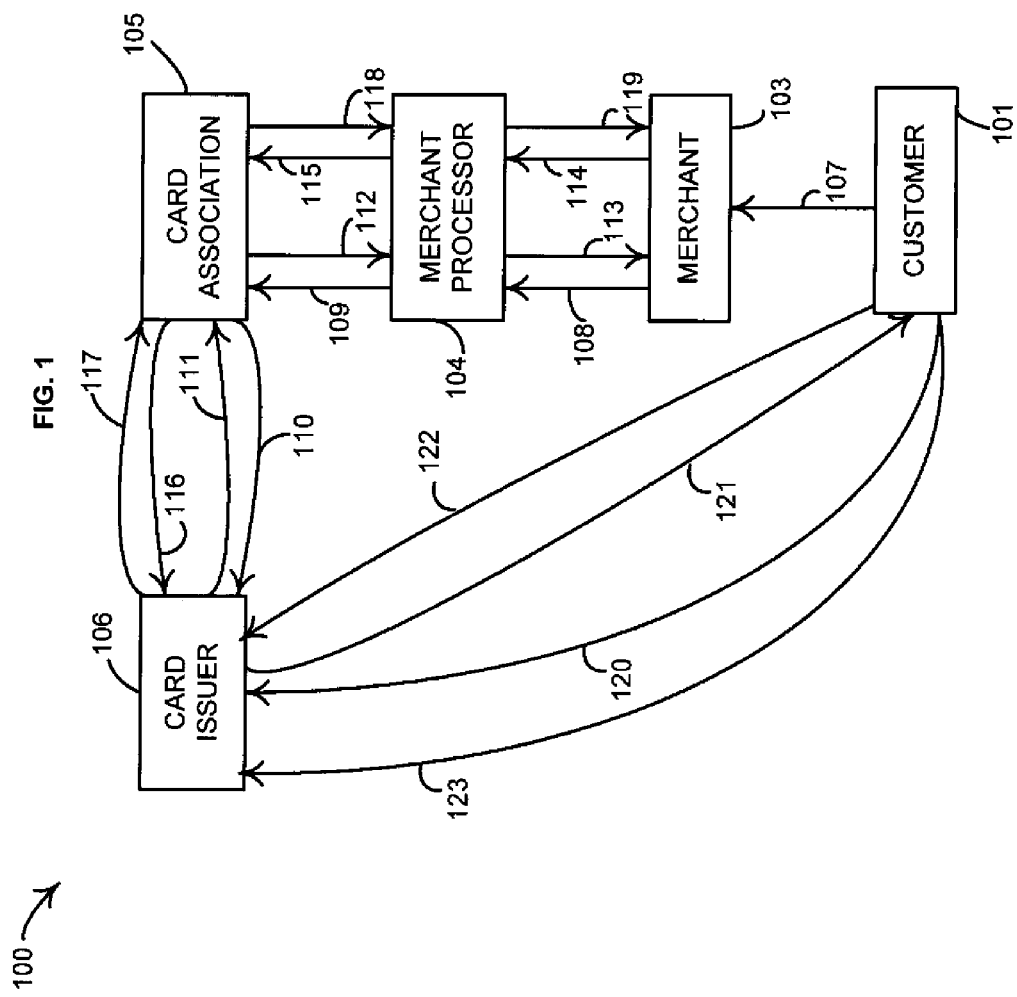
FIG. 1 depicts an exemplary embodiment of a system for collecting and managing feedback from account users via account statements according to various embodiments of the disclosure.

The following description is intended to convey a thorough understanding of the embodiments described by providing a number of specific embodiments and details involving systems and methods for collecting and managing feedback from account users via account statements. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Various exemplary embodiments provide for collecting and managing feedback from account users via account statements.

It will be recognized that feedback regarding merchants, products, services, and transactions may be very helpful to customers, especially those considering doing business with a particular merchant or those thinking about buying a certain product, for example. Various websites currently allow users to provide feedback, but each has particular constraints and deficiencies overcome by the embodiments described herein. For example, Epinions (http://www.epinions.com) allows users to give their opinions about particular consumer products and service providers. A user attempting to give a review with Epinions, however, must search for the desired product or service provider (through a text entry or category system) to locate the one that he or she wants. Epinions user feedback has no connection to any statement or financial transaction and Epinions has no way of verifying that any financial transaction actually occurred. As such, it is possible that a user could give feedback regarding a product or service provider with which he or she never did business. For example, a business might enter fake negative feedback regarding one of its competitors so that future customers are less likely to buy from the competitor. Amazon (http://www.amazon.com) similarly allows users to write reviews of books and other products, as well as sellers of new and used products, absent any connection to an actual experience with the product or seller that the reviewer is reviewing. Also, eBay (http://www.ebay.com) permits a buyer to review auction sellers from which the buyer made a purchase, but the collected feedback is of limited use because information is only collected regarding eBay sellers, not any merchant with which a customer can perform a financial transaction using a financial account.

By allowing a customer to provide feedback via a statement of financial transactions performed using a financial account, a customer may be given the opportunity to review transactions that he or she actually made. As described herein, a user interface displaying a financial statement may also be a quick and easy way for a customer to provide feedback because it is something that the customer may regularly access anyway, e.g., the customer checking his or her statement every month. The customer may also be provided functionality to authorize or restrict future financial transactions based on feedback collected from customers or may receive alerts based on such feedback, which current entities like Epinions, Amazon, and eBay do not offer.

FIG. 1 depicts an exemplary embodiment of a system 100 for collecting and managing feedback from account users via account statements according to various embodiments of the disclosure. System 100 may involve various entities and/or individuals, including, for example, a customer 101, a merchant 103, a merchant processor 104, a card association 105, and/or a card issuer 106.

System 100 may include one or more network-enabled computers to process instructions for collecting and managing feedback from account users via account statements. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of system 100 may execute one or more software applications to, for example, receive data as input from an entity accessing the network-enabled computer, process received data, transmit data over a network, and receive data over a network. The one or more network-enabled computers may also include one or more software applications to enable the collecting and managing of feedback as well as the processing of a card transaction.

The components depicted in FIG. 1 may be coupled via one or more networks. As referred to herein, a network may include, but is not limited to: e.g., a wide area network (WAN), a local area network (LAN), a global network such as the Internet, a telephone network such as a public switch telephone network, a wireless communication network, a cellular network, an intranet, or the like, or any combination thereof. In various exemplary embodiments, the network may include one, or any number of the exemplary types of networks mentioned above, operating as a stand alone network or in cooperation with each other. Use of the term network herein is not intended to limit the network to a single network. The components depicted in FIG. 1 may communicate by electronic transmission through the one or more networks mentioned above, by physical delivery, or by any other communication mechanism. Communication between two components depicted in FIG. 1 may also include communication with any other entities between the two components.

In various exemplary embodiments, customer 101 may be any individual or entity that has an account with card issuer 106 or desires to have an account with card issuer 106. As used herein, the terms account, card account, and financial account may include any place, location, object, entity, or other mechanism for holding money or performing monetary transactions in any form, including, without limitation, electronic form. An account may be, for example, a prepaid card account, stored value card account, debit card account, check card account, payroll card account, gift card account, prepaid credit card account, charge card account, checking account, rewards account, line of credit account, or credit account. Card issuer 106 may be, for example, a bank, other type of financial institution, or any other entity that offers accounts to customers. An account may or may not have an associated card, such as, for example, a credit card for a credit account.

Customer 101 may also desire to conduct transactions with one or more merchants using his or her account with card issuer 106. For example, customer 101 may desire to purchase goods or services from a merchant. To do so, customer 101 may use a unique account identifier associated with the customer's account, which may be any sequence of letters, numbers, characters, or symbols of any length and may be associated with a payment mechanism, including, without limitation, a credit card, debit card, smart card, charge card, or any other mechanism for making payment. The payment mechanism may be issued to customer 101 by card issuer 106. For example, customer 101 may be issued a credit card that allows customer 101 to make purchases on credit up to a specified dollar limit and repay card issuer 106 for those purchases over time by making monthly payments. Card issuer 106 may pay for the purchases of customer 101 at the time of purchase on behalf of customer 101 and charge customer 101 interest for using its credit services. Also, customer 101 may use a charge card wherein the balance of the customer's card may be paid off monthly. Also, customer 101 may use a debit card wherein amounts for the purchases may be electronically debited from a checking or other account held by customer 101 at card issuer 106.

Card issuer 106 (or any other entity depicted in FIG. 1) may store the account identifier associated with the customer's account, along with any other information provided by or associated with customer 101, his or her account(s), or transactions involving the account(s), in an electronic storage medium. It is well-known in the art that electronic files and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

The account identifier of the customer's account may also be associated with card association 105, which may administer cards and act as a gateway between card issuer 106 and a merchant from which customer 101 desires to make a purchase for processing card transactions. Exemplary card associations may include, without limitation, Visa®, MasterCard®, American Express®, and Discover®.

Merchant 103 may be any entity capable of accepting an account identifier as payment. Merchant 103 may receive payments for the merchant's card transactions in various ways, such as a bank account held by merchant 103. For example, merchant 103 may establish a direct deposit account or checking account at a bank. Also, merchant processor 104 may process transactions on behalf of merchant 103.

In various exemplary embodiments, customer 101 may begin by establishing an account with card issuer 106. For example, customer 101 may establish a credit account with a particular account number and receive a corresponding Visa® credit card displaying that number, which he or she may then use to make purchases on credit. It will be recognized, however, that any type of account, card, or identifier may be used, as described herein.

Upon establishing the account, customer 101 may use the associated account identifier and/or card to purchase goods and services from, or conduct any other type of transaction with, any merchant. To make a purchase, customer 101 may, for example and without limitation, swipe his or her credit card in person at the location of a merchant using a register, card payment terminal, or point of sale (POS) system, which may read the account identifier from the magnetic stripe on the card. Also, the account identifier may be provided via a bar code on the card. Also, the account identifier may be provided via radio-frequency identification (RFID) or other automatic identification mechanisms. Various mechanisms for accepting an account identifier as payment will be recognized by those skilled in the art, including, for example, transaction processing equipment and software provided by, for example, VeriFone, Inc. of San Jose, Calif. Also, customer 101 may provide a merchant with the account identifier over the telephone or using a computer. For example, customer 101 may make a purchase electronically by entering his or her account identifier and/or other information associated with the desired purchase on the World Wide Web (WWW) site of a merchant, a site accessible via a network, or any other site accessible by a communication mechanism. Various mechanisms for conducting online transactions will be recognized by those skilled in the art. Customer 101 may also make a purchase electronically using various payment services, such as, for example, PayPal®.

In various exemplary embodiments, card issuer 106 may provide customer 101 with a statement of charges, purchases, and/or other financial transactions involving the customer's account. As used herein, the terms statement and account statement may include any representation of past, current, or future transactions, including transactions involving any type of account or financial service (e.g., checking account statement, credit card statement, bill payment statement, Automated Clearing House (ACH) transaction list, list of checks written from checking account). A transaction may be, for example, a purchase, charge, cash advance, cash withdrawal, loan, payment, bill payment, check, debit, credit, deposit, or direct deposit. For example, the statement may be a display of charges made to a customer's checking account or a list of bill payments made using the customer's debit card. The statement may include for each transaction, for example, the name or other identifier of the merchant with which customer 101 performed the transaction, the location of the merchant, the date of the transaction, the amount of the transaction, and/or the good(s) or service(s) purchased or sold. Also, the statement may be a billing statement, such as a credit card statement where customer 101 must repay card issuer 106 over time for purchases listed on the statement that he or she made on credit. The statement may be provided periodically (e.g., every month) or upon the request of customer 101 or another entity (e.g., a web site request). The statement may be limited to particular transactions (e.g., charges, deposits, payments) or limited to a particular time period (e.g., the previous month, last 90 days) or limited in any other way, as selected by card issuer 106, customer 101, or another entity. The statement may also include other information associated with the account or the transactions displayed, such as, for example, the customer's account identifier, the current balance of the account, the currently available credit line for the account, and any finance charges for unpaid balances.

The statement may be provided to customer 101 in various ways, as described herein. For example, card issuer 106 and customer 101 may communicate by electronic transmission at a retail location, by electronic transmission from a wireless/mobile device, by electronic transmission from a personal computer, by telephone via a Voice Response Unit ("VRU"), or by mail. Customer 101 may also execute a web browser program on a computer to connect to a server of card issuer 106 (e.g., via the Internet) and request the Uniform Resource Locator (URL) of a web page from the server. The server may receive the customer's request, process the request, retrieve or create the requested web page (e.g., displaying the customer's statement), and transmit the requested web page to the computer of customer 101. The customer's web browser program may then receive the web page and render it on the customer's computer screen. Customer 101 may interact with the web page by, for example, clicking on buttons or activating links associated with the web page or entering information with a keyboard. The web browser may interpret this interaction and send information to the server. Examples of commercial web browser programs suitable for this purpose are Internet Explorer available from Microsoft® Corporation, Netscape Navigator available from Netscape® Communications, Safari® available from Apple®, Inc., and Firefox® available from Mozilla Corporation. The web pages described above may be, for example, HTML (Hypertext Markup Language), XML (Extensible Markup Language), ASP (Active Server Page), Java, Javascript, XHTML (Extensible HyperText Markup Language), or Ajax (Asynchronous JavaScript and XML) files, or any other file format that allows web pages or portions of web pages to be rendered in a web browser. It will be recognized by those skilled in the art that various tools are readily available to create and render web pages.

As described in greater detail below in connection with FIGS. 2 and 3, customer 101 and card issuer 106 may interact via an interactive user interface displaying an account statement provided by card issuer 106. Customer 101 may first request the statement, as indicated by arrow 122 in FIG. 1. Card issuer 106 may then retrieve data from an electronic storage medium to build a user interface for customer 101 based on, for example, an account identifier provided by customer 101 or another entity. In various exemplary embodiments, the data may include information regarding customer 101 and his or her account (e.g., name, address, phone number, account type, account number, card type, expiration date, card association), information regarding transactions performed with the account and the merchants with which those transactions were performed, and information regarding feedback previously provided by customer 101 or other customers, as well as any type of web page functionality (e.g., images, text boxes, radio buttons, icons, drop-down menus) to render a web page as a user interface. The data may also include any parameters set by customer 101 for customizing his or her own user interface.

Information associated with the customer's transactions (and the merchants involved in those transactions) that is provided in the statement may have been received by the card issuer during the normal authorization and settlement process, as described in greater detail below. For example, when submitting an authorization request for a certain transaction, a requesting merchant may provide the merchant's name or identifier along with other information, such as the customer's card number and transaction amount. This information may be provided to card issuer 106 through the various other entities depicted in FIG. 1. It will be recognized that transaction information may be received by the card issuer in any other way as well (e.g., from an employer of customer 101 via a direct deposit transaction, from an entity via an ACH transaction, from an individual deposit of a handwritten check).

Card issuer 106 may then generate a user interface based on the retrieved information and provide it to customer 101, as indicated by arrow 121. For example, card issuer 106 may transmit web page data to the customer's web browser for display on the customer's computer screen. Also, card issuer 106 may display a user interface on a terminal screen at a branch location operated by card issuer 106, on a wireless/mobile device, or on an Automated Teller Machine ("ATM"). Also, card issuer 106 may display a user interface on a computer screen shown to an employee of card issuer 106 who may assist customer 101 in providing information. The user interface may include functionality for customer 101 to provide feedback, as shown in FIG. 2 and discussed in greater detail below.

By interacting with the user interface, customer 101 may provide feedback to card issuer 106 regarding particular transactions, merchants, products, or services that appear in the statement, as indicated by arrow 122 in FIG. 1. As used herein, the term feedback may include any information regarding a customer's experience, view, opinion, assessment, judgment, evaluation, or knowledge of a merchant, product, service, transaction, type of transaction, or other piece of information represented in the statement. It will be recognized, for example, that customer feedback regarding a particular merchant may be valuable to other customers, particularly those who are considering doing business with that merchant. For example, the opinion of a customer who had an extremely negative experience with a merchant (e.g., because the customer service was poor or the product he or she purchased from the merchant did not work) may be of great value to another customer who has the choice of whether to do business with that merchant or one of the merchant's competitors. Conversely, a customer's positive experience with a merchant may encourage another customer to buy from the same merchant so that he or she can have the same positive experience. The same applies to products and services, as well as transactions and types of transactions. For example, a customer's positive view of a product that he or she purchased could impact other customers' decisions whether or not to buy the same product, just as a customer's opinion of a particular transaction could help other customers decide whether to perform the same type of transaction (e.g., a bill payment).

Feedback may be provided to card issuer 106 in various ways. For example, the user interface may provide a set of choices for customer 101 to select and thereby rate a merchant, product, service, or transaction (e.g., positive/neutral/negative choices, one to five stars with one being the lowest rating and five being the highest rating, numerical scale of 1 to 10). In that way, feedback provided by a particular customer may be easily compared to that provided by other customers and/or aggregated (e.g., averaging the number of stars given by a set of customers). The user interface may also allow customer 101 to input feedback by text, voice, or other input mechanism. Customer 101 may, for example, type a sentence or paragraph describing his or her experience buying from a particular merchant or may give his or her opinion orally over the telephone. The user interface may also provide specific targeted questions that customer 101 may answer by entering text or selecting from among a set of choices (e.g., "Were you satisfied with your experience at this merchant?," "How did you like this product?"). The questions may be designed or provided by another entity that may purchase from the card issuer feedback answers collected by the card issuer from its customers, as described herein. The statement may also display a representation of feedback provided by other customers (e.g., the average number of stars given to a merchant by all customers).

It will be recognized that the card issuer may receive feedback from a plurality of customers, such as all customers who hold an account with card issuer 106. As feedback is received, card issuer 106 may store the data in an electronic storage medium, such as a database with tables as described herein in reference to FIGS. 4 and 5. The feedback may be organized such that all feedback for a particular merchant, product, service, or transaction may be easily retrieved. Card issuer 106 may also analyze and process the feedback by, for example, computing an average rating for a particular merchant or collecting the feedback text for the highest and lowest ratings for a merchant. This data may be stored in an electronic storage medium for later retrieval as well.

It will be understood that card issuer 106 may have many customers who each perform many transactions with many different merchants. Card issuer 106 may therefore be able to collect a considerable amount of very detailed feedback, which it may then provide to its customers for later use. For example, customer 101 may be considering shopping at a particular retail merchant but want to read other customers' reviews of that merchant first. Customer 101 may provide the name of the merchant to card issuer 106 and card issuer 106 may then provide a user interface, such as the user interface described in reference to FIG. 3 below, displaying all of the feedback it has received regarding that merchant. The information may be logically organized to be of maximum benefit to the user (e.g., highest to lowest ratings, most recent feedback first) or may be customized according to a request from customer 101 (e.g., all feedback in the past month). Customer 101 may also review just the feedback that he or she has previously entered and alter it if the customer's opinion has changed. Similar data may be provided for products that customer 101 desires to purchase or transactions that customer 101 desires to perform.

It will also be recognized that the large amount of very detailed feedback that card issuer 106 may collect may also be valuable to other individuals and/or entities. For example, a merchant may benefit from knowing that its customers rated it poorly recently. Advertisers may also benefit by tailoring their marketing strategies to customers' opinions of particular merchants and products. Investors may also realize improved stock analysis from analyzing feedback given to the merchants in which they invest.

In various exemplary embodiments, card issuer 106 (or any other entity that collects feedback as described herein) may sell the feedback that it collects to these entities for a profit. Card issuer 106 may customize the feedback provided to a certain purchaser in accordance with the purchaser's requests (e.g., a bar graph report showing feedback ratings given to the merchant over time by customers in various geographic regions, batch feedback data for the past 90 days). Card issuer 106 may also perform various data mining procedures by combining the collected feedback with other information about its customers to determine trends or predict future behavior. For example, card issuer 106 may analyze the feedback given by a particular customer that just had a child to determine what products she is likely to buy in the future and offer the customer a coupon or discount for those products. Card issuer 106 may also determine the collective feedback of a very detailed subset of customers, such as all male customers living in a particular town who make over $40,000 and shop at a particular merchant. Also, card issuer 106 may differentiate corporate customers from individual consumers or weight the feedback provided by particular customers more than others for analysis purposes. Such information may be provided to customers or marketed to other entities, as described herein. Card issuer 106 may further analyze transaction feedback to determine how satisfied its own customers are with their overall experience with card issuer 106 (e.g., whether they are buying things they like) and therefore understand its customers better. For example, card issuer 106 may offer dissatisfied customers a better credit card rate so that they do not choose to cancel their accounts.

Card issuer 106 may also encourage its customers to provide feedback to maximize the amount of feedback collected. For example, card issuer 106 may offer customer 101 a cash-back reward or other financial incentive for each instance of feedback. Card issuer 106 may also only allow customer 101 to view feedback if he or she has provided feedback in the past. A customer may further be self-motivated to provide feedback because doing so may encourage others to provide feedback that may be of value to the customer when he or she needs it. It will also be understood that customers often provide feedback on their own initiative when they have had a very good or notably bad experience with a merchant, for example.

In various exemplary embodiments, customer 101 may also request through a user interface provided by card issuer 106 that he or she be alerted whenever a particular transaction or transaction involving a particular merchant, product, or service with a certain associated feedback level is attempted. For example, customer 101 may want to be alerted whenever a transaction over $1000 is attempted with a merchant that has a rating of two stars or less. In that way, customer 101 may avoid doing business with risky or inferior merchants. Card issuer 106 may receive the customer's request and store it in an electronic storage medium for later retrieval. When a desired transaction is later submitted for authorization, for example, card issuer 106 may search for any pending alert requests associated with the customer's account identifier and, if a match for the merchant submitting the authorization request is located, provide an immediate alert to customer 101 (e.g., telephone message, fax message, e-mail, text message, or instant message) so that customer 101 may make an informed decision whether or not to complete the transaction.

In various exemplary embodiments, customer 101 may also request that future transactions with his or her account be authorized or restricted based on feedback received from customer 101 or other customers, as indicated by arrow 123 in FIG. 1. For example, customer 101 may desire that all transactions involving a merchant with a rating of two stars or less be denied. Also, customer 101 may desire that transactions over $1000 only be authorized when the respective merchant is rated four stars or above. Also, customer 101 may want to restrict the purchase of products with certain reviews (e.g., products that are described as offensive or objectionable to minors). Other types of limiting authorizations and restrictions may be provided as well. After receiving the customer's request, card issuer 106 may provide to customer 101 (e.g., by web page, by text message, by mail) an acknowledgement that future transactions will be authorized and restricted in the requested manner, or may request any further information necessary for complying with the customer's request. Card issuer 106 may also ensure the customer's security by, for example, requiring customer 101 to authenticate himself or herself (e.g., with a username and password) or sign a written document prior to implementing an authorization or restriction request. Card issuer 106 may also present a "default" setting whereby all transactions with all merchants for any product or service are initially allowed. Customer 101 may then modify those settings by requesting restrictions over time.

It will be recognized that the user interfaces described herein may be provided by, and feedback, alert requests, and authorization/restriction requests may be received by, any entity involved in handling and/or processing transactions and not just card issuer 106, including card association 105, merchant processor 104, or merchant 103 depicted in FIG. 1. In those cases, customer 101 (and/or card issuer 106) may provide feedback, alert requests, or authorization/restriction requests, as described herein, to that respective entity so that the entity can use the information received or pass along information to yet another entity that may act on the information.

FIGS. 2 and 3 each depict an exemplary user interface for collecting and managing feedback from account users via account statements according to various embodiments of the disclosure. User interface 201 in FIG. 2 and user interface 301 in FIG. 3 may each be presented to the customer in the form of a graphical web page with interactive functionality such that the customer may view, select, move, and/or drag-and-drop particular items on the page using a computer mouse to thereby provide and receive feedback regarding merchants, products, services, or transactions.

User interface 201 may be presented in the form of a statement, such as, for example, a credit card billing statement. User interface 201 may include one or more elements, including an account display 202, time period display 203, summary display 204, account information section 205, payments section 206, transactions section 207, and finance charge section 226. As shown in FIG. 2, account display 202 may show the customer's name ("John Doe"), the type of account currently in use ("Platinum Account"), and the account identifier for the account (card number 1234 1234 1234 1234). Account display 202 may also include an input mechanism (not shown), such as a drop-down menu or separate window, that allows the customer to choose which account should be displayed. Also, the customer may select exactly what transactions to display in the statement (e.g., transactions in the last month, transactions over $100), as described herein. Time period display 203 may show the time period for which transactions in the statement are being displayed (e.g., "Statement for Jan. 1, 2008 to Jan. 31, 2008"). Summary display 204 may show summary information for the customer's account. As shown in FIG. 2, for example, the customer John Doe had a previous balance of $118.83 but paid off the balance in its entirety and now has a balance of $277.09 and minimum payment due of $50.00. Account information section 205 may also show information associated with the customer's credit account, such as the total credit line for the account, the total available credit, the credit line for obtaining cash, and the total available credit for cash. Payments section 206 may display information regarding any payments that the customer made toward the balance of the account. As shown in FIG. 2, the customer made a payment of $118.83 on Jan. 17, 2008. Finance charge section 226 may describe any finance charges applicable to the customer's account. As shown in FIG. 2, because the customer paid his previous balance on time resulting in a zero balance, he did not incur any finance charges.

Transactions section 207 may list the transactions for the time period shown in time period display 203 (e.g., past, current, or future transactions, such as future scheduled bill payments) in a column format showing the date 208, description 210, and amount 211 of each transaction. Description 210 may be the name of the merchant with which the transaction was conducted, the name of the product or service purchased, or any other information to identify the respective transaction, merchant, product(s), or service(s). A column for feedback 209 may also be provided with various input mechanisms for each transaction. As shown in FIG. 2, user interface 201 may include a positive feedback selector 213 that the customer may select to indicate that his or her experience with the merchant in the transaction was positive, a negative feedback selector 214 for indicating the opposite, a neutral feedback selector 222 for indicating that the customer's experience was neutral, and a review selector 215 for inputting feedback as free text. In various exemplary embodiments, positive feedback selector 213, negative feedback selector 214, and neutral feedback selector 222 may comprise a hyperlink to a new window, button, radio button, or drop-down menu that the customer may operate with a computer mouse. Upon selecting review selector 215, user interface 201 may, for example, display a popup, separate window, or other input mechanism whereby the customer may input feedback text, answer questions regarding his or her experience with the respective merchant, or input any other feedback, as described herein. User interface 201 may receive such input (e.g., mouse input, keyboard input) from the customer and cause it to be provided electronically to the card issuer or other entity that provides user interface 201. The feedback may then be stored in an electronic storage medium for future retrieval.

Each transaction shown on the statement may also include a feedback indicator 219 to show the current level of feedback for the particular merchant (e.g., three stars for XYZ Restaurant). The feedback indicator 219 may be associated with an aggregate level of feedback monitored and maintained by the card issuer over time as customers provide feedback about the merchant (e.g., an average number of stars, an average rating from 1 to 10). The feedback indicator 219 may also be selected by the customer to display a popup or separate window showing detailed feedback entries from a plurality of customers regarding the selected merchant, as described in reference to FIG. 3, for example. In that way, the customer viewing user interface 201 may be able to see how other customers have reviewed a particular merchant with which the customer also did business.

The transactions listed in transactions section 207 may also each include a navigational tool to allow the user to dynamically expand or contract the transaction to display further information. For example, the navigational tool may be a "+" or "−" icon. When a transaction is collapsed, only description 210 may be displayed and the icon may appear as a "+", such as icon 217. The customer may click on the "+" icon with the customer's computer mouse to expand the field. The field may also be expanded whenever the customer moves the customer's computer mouse pointer over the "+" icon. When a transaction is expanded, additional information, such as the product(s) or service(s) purchased or any other details of the transaction (e.g., merchant location, transaction amounts) may be displayed and the icon may appear as a "−", such as icon 216. The customer may click on the "−" icon with the customer's computer mouse to collapse the field or the field may also be collapsed whenever the customer moves the customer's computer mouse pointer over the "−" icon. As shown in FIG. 2, the customer John Doe purchased a hammer from the merchant ABC Hardware on Jan. 22, 2008 for $12.55. The product listing shown when the transaction is expanded may include a data selector 220, which when selected may cause further information to be displayed about the transaction (e.g., description of a product, manufacturer of a product, warranty information) in, for example, a new window. The product listing may also include a product rating selector 221 that the customer may select to give feedback regarding the product that is listed. The product rating selector 221 may comprise a hyperlink to a new window, button, radio button, or drop-down menu that the customer may operate with a computer mouse.

The card issuer may receive the product information presented in user interface 201 in various ways. For example, the merchant may provide such information at any time, including during the authorization and settlement procedures described herein. Also, the customer may provide information about the products that he or purchases or sells. Also, any other entity may provide information regarding a past, current, or future transaction. The card issuer may also sort or parse incoming transaction information and feedback such that all instances for a particular merchant (e.g., "ABC Hardware") are correlated with all other instances for that merchant, and likewise for products, services, transactions, and types of transactions.

User interface 201 may also provide links to other windows or input mechanisms where the customer may perform related actions, such as setting alerts for certain events, which may be specified by either the customer, the card issuer providing user interface 201, or another entity. For example, the customer may click on the "Set Alerts" link 224, which may open a drop-down menu on user interface 201 or open a separate window where the user may choose a particular type of alert. For example, the customer may choose to receive a text message or prerecorded voice message on his or her cell phone whenever a transaction is attempted with a merchant that has particularly negative feedback, as described herein. It will be recognized by those of skill in the art that alerts may be provided in any number of ways, including, for example, a telephone message, fax message, e-mail, text message, or instant message, and may be sent to the customer or to any other individual or entity. Also, a card issuer may alert a customer who is not registered to use user interface 201 when a transaction is performed with a merchant that has negative feedback and provide a mechanism for the customer to access user interface 201 and prohibit such transactions in the future, as described herein.

In various exemplary embodiments, the customer may also be alerted whenever he or she attempts a transaction with a merchant, or arrives at the location of a merchant, that has positive or negative feedback. For example, when a transaction is submitted for authorization, the card issuer may recognize that the transaction is being attempted at a merchant that has positive feedback and may send a text message informing the customer of that fact. The text message may also include a coupon for an additional purchase or other incentive for the customer. Also, a customer may choose to receive alerts for new coupons, discounts, or credit incentives for certain highly-rated merchants, in which case the card issuer may provide the alert whenever a new incentive is available. The alert may comprise a code for receiving the incentive or instructions regarding where the incentive may be obtained. Also, a customer may be alerted whenever he or she arrives or travels near the location of a merchant with particular feedback. It will be understood that there may be many ways in which the customer's current physical location may be determined, such as, for example, Global Positioning Systems (GPS) and SIM cards in wireless/mobile devices. For example, whenever the customer arrives at the location of a merchant with very negative feedback, a text message may be sent right away so that the customer does not make a purchase that he or she might regret later. It will be recognized that an other options may be set by the customer or another entity for alerts.

In various exemplary embodiments, a "Set Feedback Restrictions" link 223 may be used in a similar way to allow the customer to select what transactions should be authorized or restricted based on levels of feedback, as described herein. For example, the customer may select to restrict all transactions with merchants that have feedback ratings below a certain level. It will be recognized that an other options may be set by the customer or another entity for authorizing and restricting transactions based on feedback.

User interface 201 may also link to other systems to allow a customer added functionality. For example, when a customer gives very negative feedback regarding a particular transaction, user interface 201 may provide a link to another user interface or system where the customer may dispute the charge and/or alert his or her card issuer or the merchant to the problem. In that way, the customer may receive an enhanced experience interacting with user interface 201.

In various exemplary embodiments, user interface 201 may also allow the customer to exit user interface 201 by, for example, clicking a "Logout" link 225. User interface 201 may then, for example, redirect the user's web browser to another web page and delete information associated with the customer from the customer's computer to ensure the customer's security.

It will be understood that user interface 201 need not be a graphical user interface and may comprise any mechanism for communicating with and receiving input information from a customer. For example, user interface 201 may be a Voice Response Unit ("VRU") for interactive voice response where a customer may provide feedback by speaking or typing numbers on a keypad.

FIG. 3 depicts an exemplary user interface for collecting and managing feedback from account users via account statements according to various embodiments of the disclosure. User interface 301 may display feedback that customers previously provided for particular merchants, products, services, or transactions in a format that is organized and easy to use and understand. User interface 301 may include one or more elements, including an account display 302 showing the accessing customer's name ("John Doe"), the type of account currently in use ("Platinum Account"), and the account identifier for the account (card number 1234 1234 1234 1234). Account display 302 may also include an input mechanism (not shown), such as a drop-down menu or separate window, that allows the customer to choose which account should be displayed. Title display 303 may show a title indicating the current display. As shown in FIG. 3, the customer may be viewing feedback for the merchant ABC Hardware (e.g., "View Merchant Feedback—ABC Hardware").

In various exemplary embodiments, user interface 301 may include various elements to allow the customer to select exactly what feedback should be displayed. For example, the customer may view feedback regarding a particular merchant by selecting "Choose Merchant" icon 311, feedback regarding a particular product (or service) by selecting "Choose Product" icon 312, feedback regarding a particular transaction or type of transaction by selecting "Choose Transaction" icon 313, or feedback that the customer previously provided by selecting "View Your Reviews" icon 314. User interface 301 may also include a sorting mechanism 304, time period selector 305, and amount selector 306. Each may be a drop-down menu allowing the customer to select among multiple choices. As shown in FIG. 3, the customer may have selected to sort the feedback by "Most Recent" first and to display feedback from the "Last 30 Days" for "Transactions<$1000." Any other choices may be provided to the customer for sorting and organizing the feedback results as well.

Feedback section 315 may display the organized feedback entries in a column format showing the date 307, customer 308, transaction amount 316, rating 309, and review 310 for each instance of feedback provided by a customer of the card issuer. As shown in FIG. 3, the feedback results are organized according to the parameters set by the customer, i.e., feedback from the last thirty days for transactions of less than $1000 with the most recent appearing first. Customer column 308 may display user names for each customer rather than actual names for security purposes. It will be understood that customers may also be more willing to provide feedback if they can do so anonymously. For example, the user name "John12" may correspond to the customer John Doe viewing the user interfaces depicted in FIGS. 2 and 3, as described herein. Rating column 309 may display a representation of the feedback rating given to the merchant by the respective customer, such as a number of stars or other rating system set by the card issuer. Review column 310 may display text input by the customer for that review. As shown in FIG. 3, for example, on Jan. 22, 2008, John12 gave the merchant ABC Hardware a merchant rating of two stars and commented that he received "Average service" at the merchant. The card issuer may aggregate all feedback for a particular merchant and give the merchant an average rating, such as one star for ABC Hardware as shown in FIG. 2.

Also, the feedback entries displayed in feedback section 315 may be links to further information. For example, the customer may click on a particular user name listed in customer column 308 to see all reviews provided by that customer. Also, if the customer clicks on a particular review in review column 310, user interface 301 may display a popup or separate window with additional information about that review or the complete text of the review. The customer may then provide his or her own feedback or, if the customer clicking on the review is the one that gave the review, user interface 301 may also allow the customer to modify his or her previous review. Also, although merchant feedback is shown in FIG. 3, it will be recognized that feedback provided by customers for particular products, services, transactions, or types of transactions, may also be displayed in a similar manner. Feedback regarding multiple merchants, multiple products, multiple services, multiple transactions, or multiple types of transactions may also be displayed at the same time.

FIG. 4 depicts an exemplary database table for use in collecting and managing feedback from account users via account statements according to various embodiments of the disclosure. In reference to FIG. 4, the card issuer may have received feedback from many different customers about their experiences with many different merchants and populated a merchant feedback table 400, which may be stored electronically in a database. The card issuer may later refer to merchant feedback table 400 whenever a future customer desires to view feedback about a particular merchant or set of merchants. For example, upon receiving a customer request for feedback about the merchant ABC Hardware, the card issuer may search merchant feedback table 400 for all feedback entries regarding that merchant and provide those to the customer, for example, in user interface 301 depicted in FIG. 3. Merchant feedback table 400 may also categorize merchants and/or merchant locations (e.g., multiple retail locations for the merchant ABC Hardware) by, for example, type of business and geographic region. Such information may be stored and later provided to customers in a user interface, as described herein.

Merchant feedback table 400 may comprise entries 412-415 for particular instances of feedback, wherein each is given an entry number 401. For example, entry 412 may correspond to a feedback entry provided by a customer regarding ABC Hardware. Each entry may comprise information associated with the respective instance of feedback, such as merchant name 402, merchant ID 403, merchant group 404, merchant location 405, product ID 406, customer account number 407, transaction ID 408, feedback rating 409, feedback text 410, and date of feedback 411. Merchant ID 403 may be a number or other identifier used to identify a particular merchant for sorting and retrieval purposes. Merchant group 404 may also be used to categorize groups of merchants so that, for example, customers may view feedback about merchants in a certain business or industry (e.g., "Retail—Hardware" businesses). Merchant location 405 may likewise be used to categorize merchants by physical location so that, for example, customers may view feedback about merchants in a particular area (e.g., "Region 4" corresponding to the eastern part of the country). It will be recognized by those of skill in the art that there may be many ways to organize data hierarchically in a database or other storage mechanism and merchant group 404 and merchant location 405 may refer to more than one hierarchical category. Product ID 406 may identify a particular product(s) purchased from the respective merchant (if any) by the customer giving the feedback. Customer account number 407 may identify the customer that gave the feedback. Transaction ID 408 may identify the particular transaction for which the customer gave the feedback (if any). Feedback rating 409, feedback text 410, and date of feedback 411 may also correspond to the feedback provided by the customer, as described herein.

FIG. 5 depicts an exemplary database table for use in collecting and managing feedback from account users via account statements according to various embodiments of the disclosure. In reference to FIG. 5, the card issuer may have received feedback from many different customers about products or services that they purchased from various merchants and populated a product feedback table 500, which may be stored electronically in a database. The card issuer may later refer to product feedback table 500 whenever a future customer desires to view feedback about a particular product or service. For example, upon receiving a customer request for feedback about a specific product, the card issuer may search product feedback table 500 for all feedback entries regarding that product and provide those to the customer, for example, in user interface 301 depicted in FIG. 3. Product feedback table 500 may also categorize products by brand, manufacturer, type, cost, and geographic region where offered. Such information may be stored and later provided to customers in a user interface, as described herein.

Product feedback table 500 may comprise entries 512-515 for particular instances of feedback, wherein each is given an entry number 501. For example, entry 512 may correspond to a feedback entry provided by a certain customer regarding a hammer purchased at a hardware store. Each entry may comprise information associated with a particular instance of feedback, such as product name 502, product ID 503, product category 504, product subcategory 505, merchant ID 506, customer account number 507, transaction ID 508, feedback rating 509, feedback text 510, and date of feedback 511. Product ID 503 may be a number or other identifier used to identify a particular product(s) for sorting and retrieval purposes. Product category 504 (e.g., "Retail") and product subcategory 505 (e.g., "Home Improvement") may be used to hierarchically categorize groups of products so that, for example, customers may view feedback about a group of products and determine which is best or which merchant offers the best product. Merchant ID 506 may identify the merchant from which the customer purchased the respective product(s). Customer account number 507 may identify the customer that gave the feedback. Transaction ID 508 may identify the particular transaction for which the customer gave the feedback. Feedback rating 509, feedback text 510, and date of feedback 511 may also correspond to the feedback provided by the customer, as described herein.

Feedback regarding particular transactions or types of transactions may also be stored in tables similar to those depicted in FIGS. 4 and 5. It will also be recognized that separate databases may be maintained for merchant, product, service, or transaction feedback, respectively, or one database may be used to store all feedback collectively.

Returning to FIG. 1, card issuer 106 (or any other entity involved in handling and/or processing transactions) may provide a mechanism for customer 101 to be alerted whenever a transaction involving a merchant, or transaction for a certain product or service, is attempted. Also, card issuer 106 may provide a mechanism allowing customer 101 to set authorizations and restrictions for transactions based on feedback. As described herein, card issuer 106 may receive a request from customer 101 and use that information in the future to alert customer 101 or authorize and restrict transactions as they occur. For example, when an attempted transaction is initiated using the customer's account identifier and/or card, such as a purchase of goods or services from merchant 103, the transaction may need to be authorized by various entities and payment made for the transaction, as described in further detail below. It will be recognized by those skilled in the art that in at least some exemplary financial transactions (e.g., credit card transactions), there may be at least two phases: authorization and settlement. In the authorization phase, a merchant may perform various actions to find out whether a customer's desired transaction is valid (e.g., if the customer has sufficient funds in his or her account or sufficient credit available to make a particular purchase). If the transaction is valid, the merchant may receive payment for the transaction in the settlement phase (e.g., from the customer's card issuer). Each phase will be discussed in reference to FIG. 1.

Authorization Phase: As indicated by arrow 107, customer 101 may provide merchant 103 with his or her account identifier (e.g., by swiping a credit card) to purchase desired goods or services or conduct another type of transaction with merchant 103. After receiving the account identifier from customer 101, merchant 103 may begin the process of attempting to authorize the desired transaction by providing an authorization request to merchant processor 104, as indicated by arrow 108. The authorization request may include, for example, information associated with the amount of the desired transaction, the account identifier used for the transaction, information associated with requesting merchant 103 (e.g., a merchant identifier, address, phone number), information associated with the product(s) or service(s) being purchased (e.g., product names or identifiers), and/or any other information associated with customer 101, merchant 103, or the transaction. In various exemplary embodiments, merchant 103 may transmit the authorization request to merchant processor 104 electronically over one or more networks.

In various exemplary embodiments, merchant processor 104 may have a predefined relationship, agreement, or arrangement with merchant 103 to authorize and settle card transactions on behalf of merchant 103. Merchant processor 104 may process transactions for a plurality of merchants and a plurality of customers. For example, TSYS Acquiring Solutions, LLC (TSYS), which those skilled in the art will recognize as an entity that authorizes and settles card transactions, may operate as merchant processor 104.

As indicated by arrow 109, merchant processor 104 may provide the authorization request, or any other authorization data, to card association 105 associated with the account identifier of customer 101. For example, if customer 101 attempted to pay for a purchase with a Visa® credit card, the authorization request may be routed to Visa®. If customer 101 attempted to pay for a purchase with a MasterCard® credit card, the authorization request may be routed to MasterCard®. Card association 105 may perform various actions to verify that the desired transaction may be completed, including, for example, verifying that there may not have been a temporary or permanent hold placed on the card or verifying that one or more predetermined fraud parameters may not have been triggered. For example, card association 105 may verify that the amount of the desired transaction is not unusually large based on the customer's recent purchases.

As indicated by arrow 110, card association 105 may provide the authorization request, or any other authorization data, such as, for example, information associated with verification of customer 101 or transaction, as described herein, to card issuer 106, which issued a card to customer 101. For example, if customer 101 obtained his or her card from a bank, that bank may act as card issuer 106. Card issuer 106 may perform various actions to verify that the desired transaction may be completed, including, for example, verifying that the account identifier is valid and/or verifying that the desired purchase is within the credit or debit limit available to customer 101.

Card issuer 106 may also perform various actions in accordance with a request from customer 101 to be alerted or to authorize and restrict transactions based on feedback. In various exemplary embodiments, card issuer 106 may extract information received in the authorization request, such as the name of merchant 103, or a merchant identifier (e.g., a sequence of letters, numbers, characters, or symbols of any length) associated with merchant 103, and compare that data to information provided by customer 101 and stored customer feedback (e.g., feedback described in reference to FIGS. 2 and 3) to determine if the transaction should be authorized or not or if an alert should be provided. The process may involve searching a database table for requests from customer 101, as described herein and in reference to FIG. 9. For example, customer 101 may have requested that all transactions with merchants rated two stars or less be restricted. Also, customer 101 may have requested that a certain set of expensive products with low feedback be restricted. Also, customer 101 may have requested to receive an alert whenever a transaction is attempted with a merchant having very high feedback.

Based on the authorization request, information provided by customer 101, and stored customer feedback, card issuer 106 may create an authorization message approving or denying the transaction. If customer 101 has not requested any restriction that would apply to the pending transaction, or has requested an authorization that would apply to the pending transaction, the transaction may be approved. If, however, customer 101 has requested a restriction that would apply to the pending transaction, the transaction may be denied. Customer 101 may also override a restriction in various ways (e.g., telephone call to a call center, text message with password) to verify that he or she desires to complete the transaction regardless of the restriction. The authorization message provided by card issuer 106 may eventually be routed back to merchant 103, as described herein. Card issuer 106 may also provide an alert as directed by customer 101.

As indicated by arrow 111, card issuer 106 may provide the authorization message to card association 105. As indicated by arrow 112, card association 105 may provide the authorization message, or any other authorization data, to merchant processor 104. In various exemplary embodiments, an entity may operate as both card association 105 and card issuer 106. Merchant processor 104 in that situation may route the authorization request to the combined entity and the combined entity may provide the authorization message to merchant processor 104. Also, card association 105 itself may operate as card issuer 106, as described herein. Merchant processor 104 in that situation may route the authorization request to card association 105 and card association 105 may determine whether any applicable authorizations or restrictions have been established and provide the authorization message to merchant processor 104.

As indicated by arrow 113, merchant processor 104 may provide the authorization message, or any other authorization data, to merchant 103. If the transaction was denied, merchant 103 may deny the desired transaction and, for example, refuse to provide customer 101 with his or her desired goods or services. The authorization message may comprise an explanation for why the transaction was denied (e.g., because the feedback rating for merchant 103 was too low) and/or information for customer 101 to override the denial and complete the transaction (e.g., a telephone number to call). The information in the authorization message may be provided to customer 101 on, for example, a screen at a card payment terminal or via a mechanism that is not by merchant 103 (e.g., a text message). If the transaction was approved, however, merchant 103 may complete the transaction by, for example, receiving the customer's written signature on a receipt, providing the desired goods or services to customer 101, and/or storing information associated with the transaction for later settlement. For example, merchant 103 may store information electronically in a batch file or other storage mechanism.

Settlement Phase: During the settlement phase, merchant 103 may receive payment for one or more card transactions, such as purchases of goods and services that merchant 103 provided to its customers. In various exemplary embodiments, merchant 103 may accumulate transactions until a predetermined threshold has been reached, such as, for example, a predetermined total amount or predetermined period of time (e.g., at the end of each business day), before proceeding with settlement. Merchant 103 may store information associated with each transaction in one or more batch files for later settlement at the predetermined time.

Merchant 103 may provide a batch file representing all of the accumulated transactions to be settled at that time to merchant processor 104, as indicated by arrow 114. For example, a transmission may occur when a predetermined threshold is reached. Merchant processor 104 may use the information in the batch file to create one or more batch files each containing transactions associated with respective card association 105. For example, merchant processor 104 may create a batch file for all Visa® credit card transactions from a plurality of merchants and transmit that batch file to Visa® as card association 105. As indicated by arrow 115, merchant processor 104 may provide the batch file to respective card association 105. Card association 105 may in turn use the batch file to create one or more batch files each containing transactions associated with respective card issuer 106. For example, Visa® may create a batch file for all transactions involving Visa® credit cards issued by a particular bank from a plurality of merchant processors and transmit that batch file to the bank as card issuer 106. As indicated by arrow 116, card association 105 may provide the batch file to respective card issuer 106.

It should be recognized that although only one card association 105 and one card issuer 106 are shown in FIG. 1, merchant processor 104 may provide a plurality of batch files to a plurality of respective card associations and the plurality of card associations may provide a plurality of batch files to a plurality of respective card issuers, as discussed herein.

In various exemplary embodiments, card issuer 106 may again determine whether customer 101 has requested any authorizations or restrictions based on feedback that might apply to any of the pending transactions. For example, customer 101 may have made a request after authorization but before settlement or the feedback associated with merchant 103 may have changed over time. In various exemplary embodiments, if customer 101 requested a restriction that would apply to a transaction currently designated for settlement, card issuer 106 may respond by notifying merchant 103, merchant processor 104, and/or card association 105 that settlement could not be completed and the reason(s) for the denial. If, however, there is no restriction that would apply to a transaction designated for settlement, or customer 101 requested an authorization that would apply to the transaction, card issuer 106 may route funds for all transactions contained in a respective batch file to respective card association 105, as indicated by arrow 117.

As indicated by arrow 118, card association 105 may relay the funds to merchant processor 104 or, for example, combine them with any other funds before providing them to merchant processor 104. In various exemplary embodiments, as indicated by arrow 119, merchant processor 104 may route the funds to merchant 103 by, for example, depositing the funds into an account held on behalf of merchant 103. For example, merchant processor 104 may route funds electronically via a funds file through the ACH Network. Also, card issuer 106 and/or card association 105 may route funds for the associated transactions directly to an account held on behalf of merchant 103 rather than routing the funds through the other entities depicted in FIG. 1. Customer 101 may later pay card issuer 106 for the transactions that customer 101 makes. For example, customer 101 may pay a monthly bill to card issuer 106 and may choose to pay the full amount or only a partial amount of the bill. Card issuer 106 may charge customer 101 interest on any unpaid portion of a bill.

Once a transaction is completed and payment sent and received, card issuer 106 may use information extracted from the batch file, such as the name of merchant 103, its merchant identifier or address, and the amount of the transaction, and store that information as a completed transaction in a transaction database, as described herein. In that way, whenever a transaction is completed with the customer's account, card issuer 106 may update the set of transactions that may later be displayed to the customer in a statement. It will also be recognized that transaction information may be extracted from the authorization request for a transaction during the authorization stage as well.

In various exemplary embodiments, the entities described in reference to system 100, such as, for example, merchant processor 104, card association 105, and card issuer 106, may charge various entities a fee for using their services. For example, card issuer 106 may charge customer 101 a fee for authorizing or restricting certain transactions via the user interface described herein. Also, merchant processor 104 may charge merchant 103 a predetermined percentage for each transaction (e.g., 2%) and reduce the amount paid to merchant 103 accordingly. Merchant processor 104 may also, for example, pay card association 105 and/or card issuer 106 for using their services (e.g., 1.4% interchange fee). Also, any of the entities described in reference to system 100 may charge a fee to any other entity for communicating or routing funds through the charging entity via a network.

FIG. 9 depicts an exemplary database table for use in collecting and managing feedback from account users via account statements according to various embodiments of the disclosure. In reference to FIG. 9, a card issuer may have received a request to alert, restrict, or authorize particular transactions, types of transactions, or transactions involving merchants, products, or services with a particular feedback rating and populated an alert and authorization/restriction table 900, which may be stored electronically in a database. The card issuer may later refer to alert and authorization/restriction table 900 to determine whether a desired transaction should be allowed or denied during the authorization and/or settlement phases of a pending transaction, as described herein. Alert and authorization/restriction table 900 may comprise entries 916-919 for particular customer requests, wherein each is given an entry number 901. For example, entry 916 may correspond to a request by the customer "John Doe." Each entry may comprise information associated with a particular request and the customer making the request, such as customer name 902, customer address 903, customer phone number 904, customer e-mail address 905, account type 906, account number 907, expiration date 908, card association 909, status 910 (e.g., "Alert," "Restriction," or "Authorization"), merchant rating level 911 (below which transactions may be prohibited for "Restrictions" or above which transactions may be authorized for "Authorizations"), product rating level 912 (below which transactions may be prohibited for "Restrictions" or above which transactions may be authorized for "Authorizations"), begin time 913 for beginning the alert, authorization, or restriction, end time 914 for ending the alert, authorization, or restriction, and instructions 915 for performing the alert, authorization, or restriction (e.g., "All Transactions," "Transactions>$1000"). As described herein, if there is no current entry that would alert, authorize, or restrict based on an incoming transaction, the "default" step may be to authorize the transaction and not send any alert. Any other "default" setting may be set by the customer, card issuer, or other entity. Separate databases may also be maintained for alert requests, authorization requests, and restriction requests, respectively.

As described herein, when an incoming transaction is submitted for authorization, the card issuer may attempt to match the account number used for the transaction to an account number stored in alert and authorization/restriction table 900. If one or more matches are found, the card issuer may determine whether the restriction(s) in the table prohibit the desired transaction. For example, if the merchant submitting the authorization request has a feedback rating of one star (e.g., determined by the card issuer by averaging all feedback for that merchant) and the customer has a restriction entry for all transactions involving merchants with feedback ratings less than two stars as shown in FIG. 9, the card issuer may deny the transaction. If, however, no active restriction entries apply, the card issuer may allow the transaction. Likewise, if no matches are found, the card issuer may allow the transaction. It will also be recognized that information associated with a customer request for alert, authorization, or restriction may be stored in any storage mechanism with any amount of fields or types of fields, not just the table in an electronic database described in reference to FIG. 9.

Figure 6:
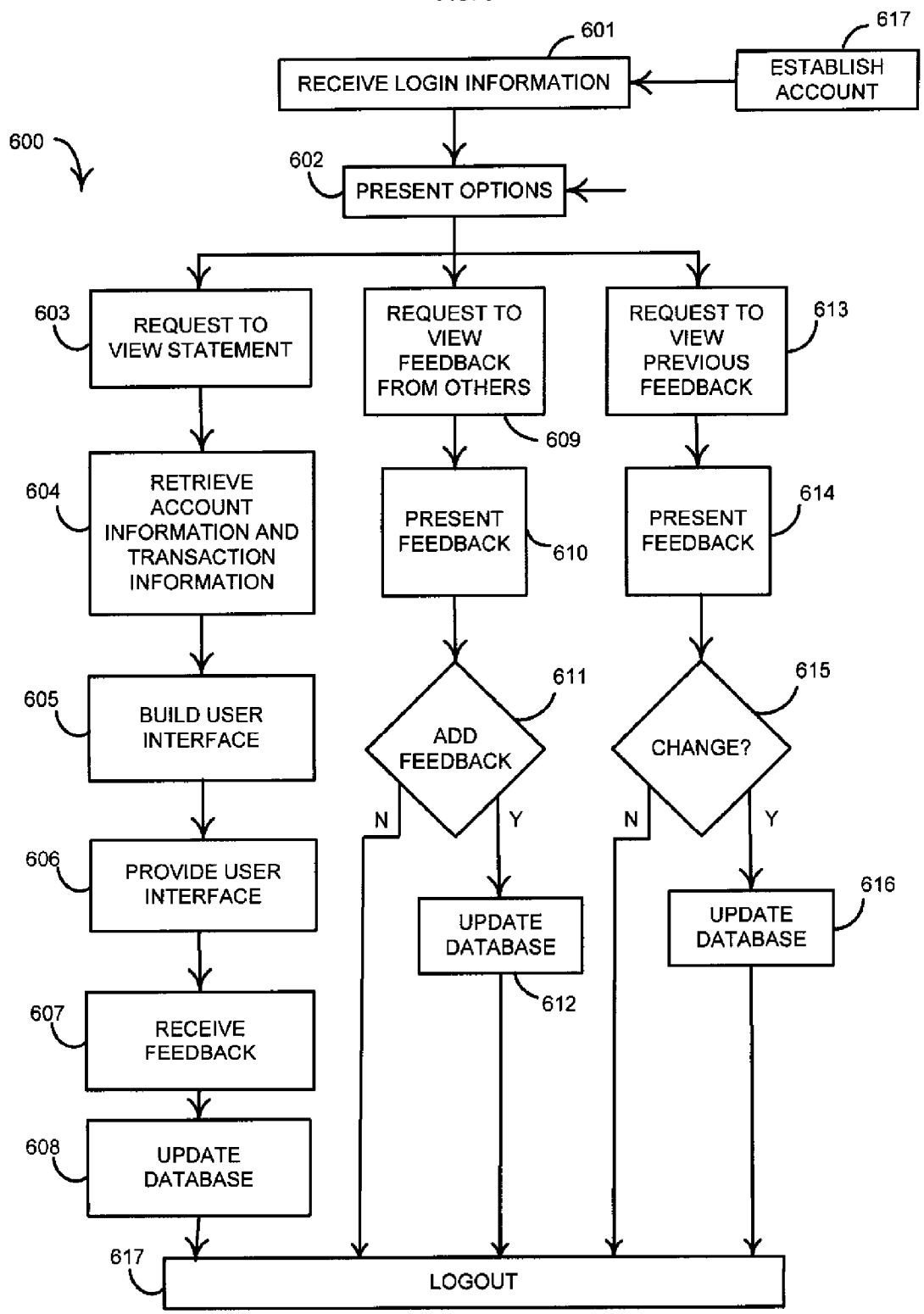
FIG. 6 depicts a flow chart which illustrates an exemplary method for collecting and managing feedback from account users via account statements according to various embodiments of the disclosure.

FIG. 6 depicts an exemplary flow chart 600 which illustrates an exemplary method for collecting and managing feedback from account users via account statements according to various embodiments of the disclosure. At block 617, a customer may establish an account, such as a credit account, with a card issuer and receive a corresponding card to be used in making purchases and conducting other transactions. At block 601, the card issuer may receive login information for a particular customer and/or account. For example, a customer may enter a user name and password on a secure web page to gain access to the card issuer's system and then enter an account identifier associated with an account for which the customer desires to view a statement. At block 602, the card issuer may present various options to the customer, such as viewing a statement, viewing feedback from other customers, or viewing feedback that the customer previously provided. At block 603, the customer may request to view a statement, as described herein. At block 604, the card issuer may retrieve account information and transaction information for the customer's account, such as account type, balance, payments, and amounts of recent transactions. At block 605, the card issuer may retrieve feedback information for the merchants, products, services, or transactions that will be displayed in a user interface and generate a user interface showing a statement including such information, as described in reference to FIG. 2. The card issuer may then provide the user interface to the customer at block 606 by, for example, transmitting data for generating a web page on a web browser. At block 607, the card issuer may receive feedback from the customer regarding a particular merchant, product, service, transaction, or type of transaction, as described herein. The card issuer may then at block 608 use the received feedback to populate a database table, such as merchant feedback table 400 in FIG. 4 or product feedback table 500 in FIG. 5, by adding a new entry or changing an existing entry in accordance with the feedback provided by the customer. The customer may then logout at block 617.

At block 609, the customer may request to view feedback provided by other customers, as described herein. At block 610, the card issuer may then generate and provide a user interface displaying the feedback in the manner requested by the customer, as described in reference to FIG. 3, for example.

If the customer chooses at block 611 to add feedback, the card issuer may use the received feedback to populate a database table, such as merchant feedback table 400 in FIG. 4 or product feedback table 500 in FIG. 5, by adding a new entry in accordance with the feedback provided by the customer. The customer may then logout at block 617.

At block 613, the customer may request to view feedback that he or she previously provided, as described herein. At block 614, the card issuer may then generate and provide a user interface displaying the feedback in the manner requested by the customer, as described in reference to FIG. 3, for example. If the customer chooses at block 615 to change any of the feedback that he or she previously provided, the card issuer may use the received feedback to change a database table, such as merchant feedback table 400 in FIG. 4 or product feedback table 500 in FIG. 5, by modifying an existing entry in accordance with the new feedback provided by the customer. The customer may then logout at block 617.

Figure 7:
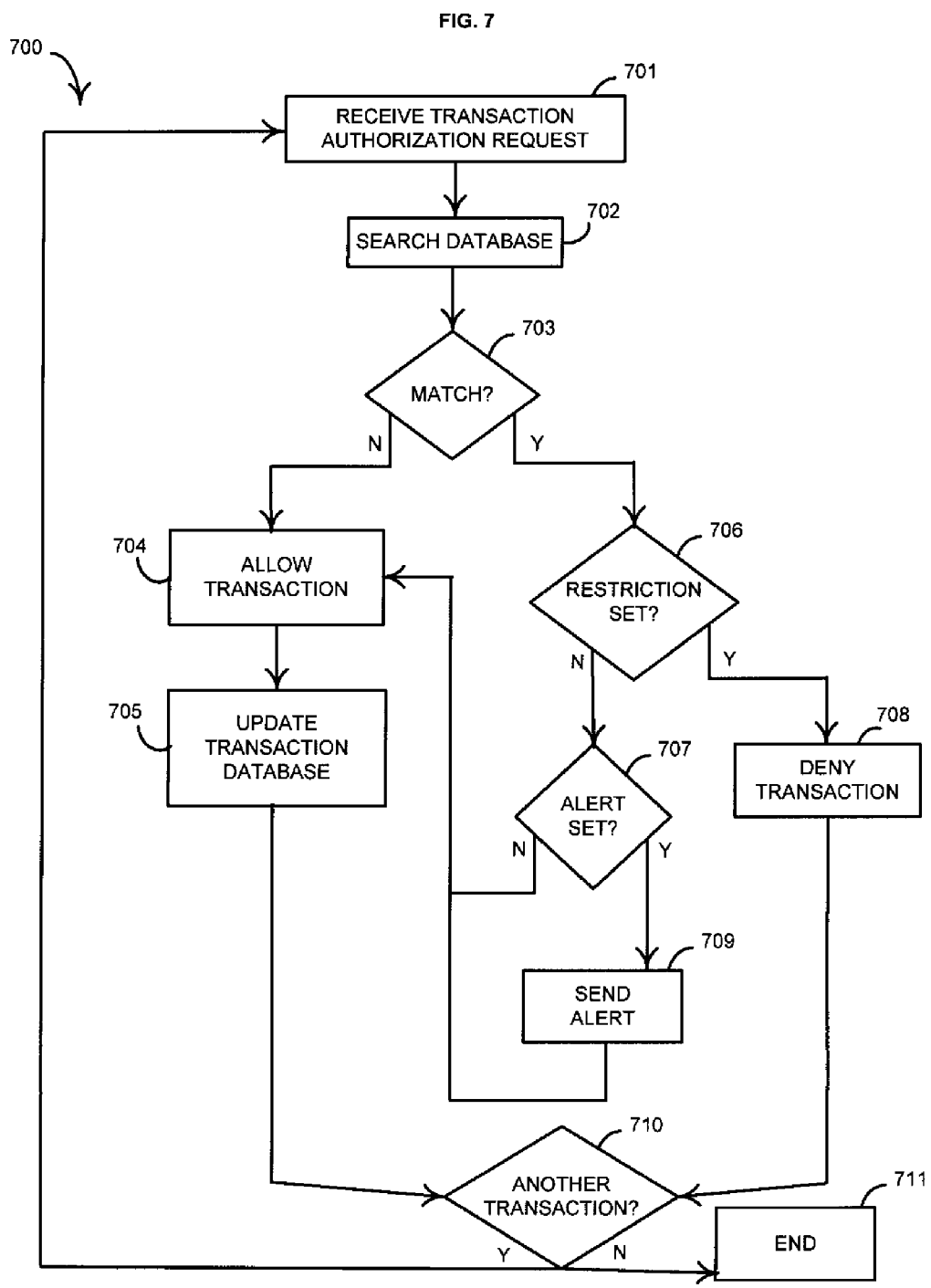
FIG. 7 depicts a flow chart which illustrates an exemplary method for collecting and managing feedback from account users via account statements according to various embodiments of the disclosure.

FIG. 7 depicts an exemplary flow chart 700 which illustrates an exemplary method for collecting and managing feedback from account users via account statements according to various embodiments of the disclosure. At block 701, the card issuer may at some point in time receive an authorization request for a particular transaction involving an account held by the customer. For example, the customer may have attempted to purchase an item from a particular merchant. As described herein, the card issuer may maintain an aggregate feedback rating for that merchant (e.g., two stars) by, for example, averaging all of the individual ratings given to that merchant by all customers. At block 702, the card issuer may search a database including various tables, such as the table described in reference to FIG. 9, for example, to determine whether the customer attempting to make the purchase has established any alerts, authorizations, or restrictions that would apply to the pending transaction. If there is a match between the account number extracted from the authorization request and the account number of a table entry in the database at block 703, the card issuer may proceed to determine at block 706 whether the customer has set a restriction that would prohibit the transaction (e.g., the merchant's feedback rating is below a designated level). If so, the card issuer may deny the transaction at block 708 and continue to 710. If not, the card issuer may determine at block 707 whether the customer requested an alert for transactions like the one being attempted, as described herein. If the customer requested such an alert, the card issuer may at block 709 send the alert (e.g., by telephone message, e-mail, text message, or instant message) and allow the transaction at block 704 (e.g., after a period of time so that the customer has time to make a decision whether to go forward with the transaction). If the customer did not request any alert that would apply to the pending transaction, the card issuer may also allow the transaction at block 704. As described herein, the card issuer may deny or allow a transaction by providing a certain authorization message to a card association. The card issuer may also alert the customer whenever a transaction succeeds if the customer has chosen to receive such alerts. The card issuer may then at block 705 update a database with information about the authorized transaction (e.g., for later settlement and providing to the customer in a statement). The card issuer may then at block 710 determine whether another transaction is ready for processing. If so, the card issuer may receive another transaction authorization request at block 701. If not, the method may end at block 711.

Figure 8:
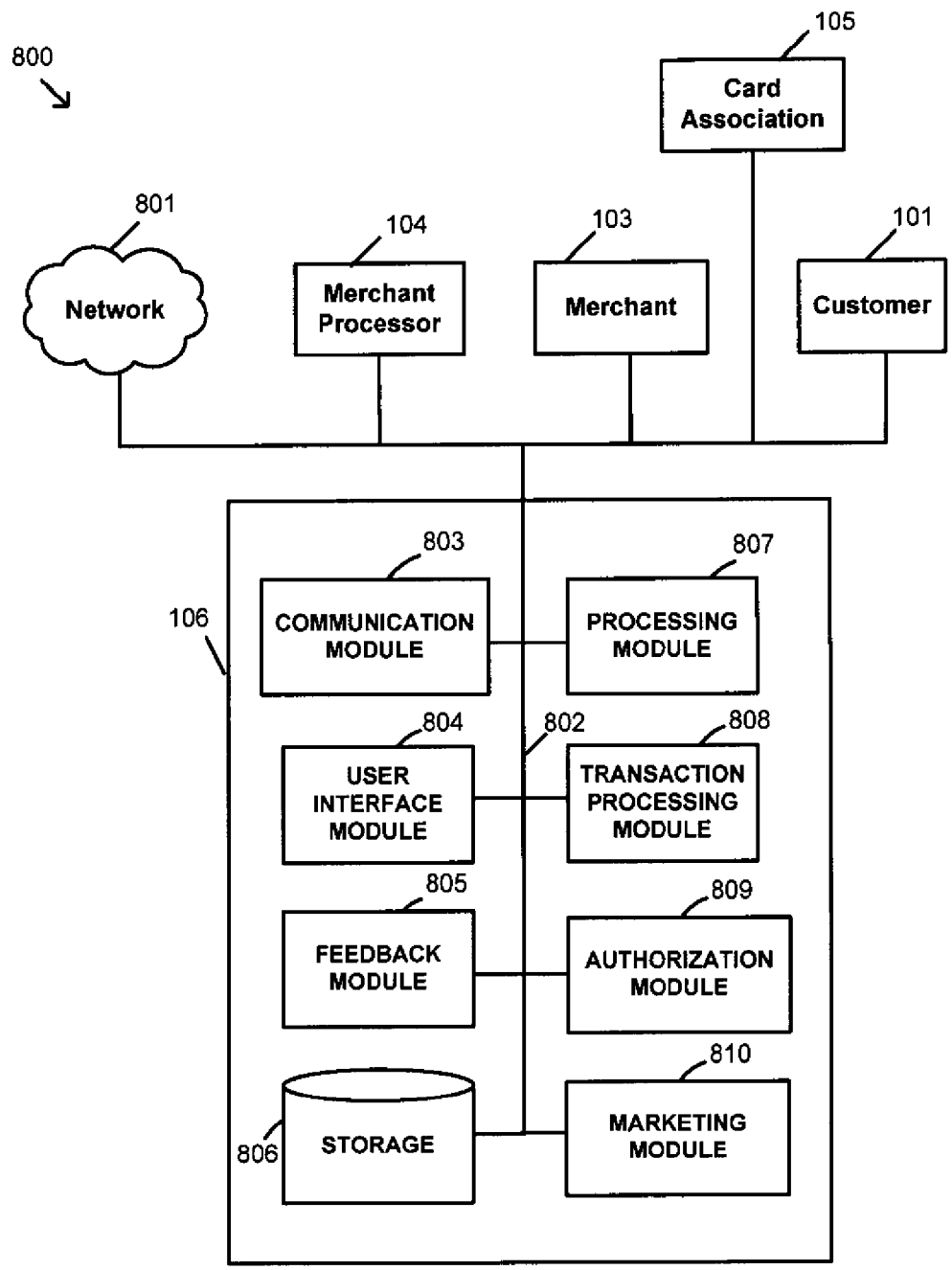
FIG. 8 depicts an exemplary system for collecting and managing feedback from account users via account statements according to various embodiments of the disclosure.

FIG. 8 depicts an exemplary system for collecting and managing feedback from account users via account statements according to various embodiments of the disclosure.

Card issuer 106 may include one or more of the following modules: a communication module 803, a user interface module 804, a feedback module 805, a processing module 807, a transaction processing module 808, an authorization module 809, and a marketing module 810. One or more of the modules may electronically communicate with each other and/or other entities, such as, for example, merchant processor 104, merchant 103, customer 101, card association 105, or any other entity over an external network 801, via a communication mechanism 802, such as a data communication bus or one or more networks as defined herein. The modules may also communicate with a storage mechanism 806, as described herein. The modules described in reference to FIG. 8 may each be an appropriately programmed computer, such as a mainframe or personal computer, or may include a plurality of such computers cooperating to perform the functionality described herein.

Communication module 803 may receive account information associated with an account held by a customer, such as an account number, for example. User interface module 804 may provide data for a user interface, such as the user interfaces described in reference to FIGS. 2 and 3. User interface module 804 may retrieve and/or generate such data from data stored in storage mechanism 806, such as account information, transaction information, feedback information, alert information, and authorization/restriction information. Feedback module 805 may then receive feedback from the customer, as described herein. Processing module 807 may store the received feedback, as well as feedback received from other customers, in, for example, tables similar to those described in reference to FIGS. 4 and 5. Transaction processing module 808 may receive authorization requests for desired transactions using the account. If a desired transaction is subject to a feedback-based restriction, as described herein, authorization module 809 may deny the attempted transaction. For example, authorization module 809 may provide an authorization message to various entities involved in authorization and/or settlement of financial transactions, as described herein. Authorization module 809 may also authorize a transaction or alert the customer or any other entity, as described herein. Marketing module 810 may provide and/or sell feedback that card issuer 106 received to other entities, as described herein.

The present invention builds trust in customers as they use their accounts to make purchases and perform other types of transactions. For example, a customer may be more likely to trust (and therefore engage in) transactions with a merchant when other customers have rated that merchant well. Customers may also be more likely to receive quality products and services when they rely on the opinions of others. Conversely, customers may be able to avoid purchasing bad products and doing business with dishonest merchants by relying on other customers' feedback. Customers may also feel a greater sense of financial responsibility and loyalty being part of a collective group of customers. For example, a customer may decide to provide feedback regarding a particular merchant because the customer knows that he or she may want to rely on the opinion of a fellow customer at some point in the future, particularly when considering an expensive purchase.

The present invention also provides added security and value for customers who use card accounts, particularly those who use card accounts regularly and may therefore be more susceptible to identity theft. For example, by prohibiting transactions with undesirable merchants that have especially low feedback, the potential for fraudulent use of the customer's account may be significantly reduced. The risk to the customer of not getting the quality product that he or she wants may also be reduced. In that way, the customer may feel a sense of added security knowing that unauthorized or undesirable transactions will not occur.

By offering customers these features, the present invention also encourages loyalty to the entity that allows its customers to provide and access feedback. For example, a card issuer may give its customers a significant advantage over other providers that do not allow the same functionality and thereby encourage its customers to open more accounts at the card issuer, which may increase the card issuer's business. A card issuer may also avoid disputes with customers over bad purchases and pass along those cost savings to its customers and thereby generate more business. A card issuer may also gain financially by selling the feedback it receives about merchants, products, services, transactions, and types of transactions to other entities that may find such information valuable.

The embodiments of the present invention are not to be limited in scope by the specific embodiments described herein. For example, the user interface may be in any format, including a VRU interface. Or, the user interface may display any image or combination of images. Or, feedback and/or transaction information may be collected in any storage mechanism and combined with any other information obtained from any source. Or, information regarding a customer's desired alerts, authorizations, and restrictions may be provided to any entity upon receipt, at the time of an authorized or restricted transaction, periodically in batches, or in any other time interval. Or, an authorization request, authorization message, and batch files created and provided in the course of a transaction may be in any form to permit authorization and settlement of a transaction. Or, the merchant may be located remotely from the customer and accessible to the customer via, for example, the telephone or one or more networks. Or, the system for collecting and managing feedback from account users via account statements may be a collection of more than one computer, each operating collectively as the system. Or, the system may be automated such that collecting and managing feedback from account users via account statements does not require interaction with an operator or a user.

Thus, such modifications are intended to fall within the scope of the following appended claims. Further, although some of the embodiments of the present invention have been described herein in the context of a particular implementation in a particular environment for a particular purpose, those of ordinary skill in the art should recognize that its usefulness is not limited thereto and that the embodiments of the present invention can be beneficially implemented in any number of environments for any number of purposes. Accordingly, the claims set forth below should be construed in view of the full breadth and spirit of the embodiments of the present invention as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

The invention claimed is:

1. A method for collecting and managing feedback from account users via account statements comprising:
   receiving account information associated with a credit or debit card account held by a first user;
   using one or more computer processors, providing data for a user interface, the user interface operable to display:
   a credit or debit card statement including credit or debit card transactions performed over a period of time, each credit or debit card transaction in the statement having been performed with a particular merchant using the financial account, one or more merchant feedback mechanisms each associated with one of the credit or debit card transactions and the merchant with which the respective credit or debit card transaction is performed, the one or more merchant feedback mechanisms enabling the first user to provide feedback information regarding the merchant with which the respective credit or debit card transaction is performed via the credit or debit card statement, and a plurality of purchase feedback mechanisms each associated with one of the credit or debit card transactions, the merchant with which the respective credit or debit card transaction is performed, and an individual product or service purchased from the merchant with which the respective credit or debit card transaction is performed, the plurality of purchase feedback mechanisms enabling the first user to provide feedback information regarding individual products or services via the credit or debit card statement;

receiving from the first user feedback information through the use of a selected merchant feedback mechanism or purchase feedback mechanism; and storing the received feedback information and feedback information received from other users.

2. The method of claim 1, wherein the financial account is a credit account and the statement of financial transactions is a credit card billing statement.

3. The method of claim 1, wherein:
the selected merchant feedback mechanism or purchase feedback mechanism comprises a rating selector of positive, negative, and neutral ratings, and
the received feedback information comprises a selection of one of the ratings.

4. The method of claim 1, wherein:
the selected merchant feedback mechanism or purchase feedback mechanism comprises a text input mechanism, and
the received feedback information comprises text.

5. The method of claim 1, wherein the feedback information received from the first user comprises information regarding the merchant associated with the selected merchant feedback mechanism or purchase feedback mechanism.

6. The method of claim 1, further comprising:
receiving an authorization request for a desired credit or debit card transaction initiated by a second user with the merchant associated with the selected merchant feedback mechanism or purchase feedback mechanism; and
providing authorization information for the desired credit or debit card transaction that is dependent, at least in part, on the received feedback information.

7. The method of claim 1, further comprising:
receiving an authorization request for a desired credit or debit card transaction initiated by a second user with the merchant associated with the selected merchant feedback mechanism or purchase feedback mechanism; and
providing to the second user an alert comprising an indication of the received feedback information and feedback information received from other users regarding the merchant associated with the selected merchant feedback mechanism or purchase feedback mechanism.

8. The method of claim 1, wherein the user interface is further operable to display feedback information received from other users.

9. The method of claim 1, wherein the user interface is further operable to display an indication of feedback information received from other users for each merchant with which each respective financial transaction is performed.

10. The method of claim 1, further comprising:
selling at least some of the received feedback information and feedback information received from other users to an entity other than the first user.

11. A system for collecting and managing feedback from account users via account statements comprising:
a communication module that receives account information associated with a credit or debit card account held by a first user;
one or more computer processors that provide data for a user interface, the user interface operable to display:
a credit or debit card statement including credit or debit card transactions performed over a period of time, each credit or debit card transaction in the statement having been performed with a particular merchant using the financial account,
one or more merchant feedback mechanisms each associated with one of the credit or debit card transactions and the merchant with which the respective credit or debit card transaction is performed, the one or more merchant feedback mechanisms enabling the first user to provide feedback information regarding the merchant with which the respective credit or debit card transaction is performed via the credit or debit card statement, and
a plurality of purchase feedback mechanisms each associated with one of the credit or debit card transactions, the merchant with which the respective credit or debit card transaction is performed, and an individual product or service purchased from the merchant with which the respective credit or debit card transaction is performed, the plurality of purchase feedback mechanisms enabling the first user to provide feedback information regarding individual products or services via the credit or debit card statement;
a feedback module that receives from the first user feedback information through the use of a selected merchant feedback mechanism or purchase feedback mechanism; and
a processing module that stores the received feedback information and feedback information received from other users.

12. The system of claim 11, wherein the financial account is a credit account and the statement of financial transactions is a credit card billing statement.

13. The system of claim 11, wherein:
the selected merchant feedback mechanism or purchase feedback mechanism comprises a rating selector of positive, negative, and neutral ratings, and
the received feedback information comprises a selection of one of the ratings.

14. The system of claim 11, wherein:
the selected merchant feedback mechanism or purchase feedback mechanism comprises a text input mechanism, and
the received feedback information comprises text.

15. The system of claim 11, wherein the feedback information received from the first user comprises information regarding the merchant associated with the selected merchant feedback mechanism or purchase feedback mechanism.

16. The system of claim 11, further comprising:
a transaction processing module operable to receive an authorization request for a desired credit or debit card transaction initiated by a second user with the merchant associated with the selected merchant feedback mechanism or purchase feedback mechanism; and an authorization module operable to provide authorization information for the desired credit or debit card transaction that is dependent, at least in part, on the received feedback information.

17. The system of claim 11, further comprising:

a transaction processing module operable to receive an authorization request for a desired credit or debit card transaction initiated by a second user with the merchant associated with the selected merchant feedback mechanism or purchase feedback mechanism; and an authorization module operable to provide to the second user an alert comprising an indication of the received feedback information and feedback information received from other users regarding the merchant associated with the selected merchant feedback mechanism or purchase feedback mechanism.

18. The system of claim 11, wherein the user interface is further operable to display feedback information received from other users.

19. The system of claim 11, wherein the user interface is further operable to display an indication of feedback information received from other users for each merchant with which each respective financial transaction is performed.

20. The system of claim 11, further comprising:

a marketing module operable to provide at least some of the received feedback information and feedback information received from other users to an entity other than the first user in exchange for payment.

21. A computer-executable program tangibly embodied on a computer readable medium effective to perform the following:

receive account information associated with a credit or debit card account held by a first user;

provide data for a user interface, the user interface operable to display:

a credit or debit card statement including credit or debit card transactions performed over a period of time, each credit or debit card transaction in the statement having been performed with a particular merchant using the financial account, one or more merchant feedback mechanisms each associated with one of the credit or debit card transactions and the merchant with which the respective credit or debit card transaction is performed, the one or more merchant feedback mechanisms enabling the first user to provide feedback information regarding the merchant with which the respective credit or debit card transaction is performed via the credit or debit card statement, and a plurality of purchase feedback mechanisms each associated with one of the credit or debit card transactions, the merchant with which the respective credit or debit card transaction is performed, and an individual product or service purchased from the merchant with which the respective credit or debit card transaction is performed, the plurality of purchase feedback mechanisms enabling the first user to provide feedback information regarding individual products or services via the credit or debit card;

receive from the first user feedback information through the use of a selected merchant feedback mechanism or purchase feedback mechanism; and store the received feedback information and feedback information received from other users.

* * * * *

UNITED STATES PATENT AND TRADEMARK OFFICE
CERTIFICATE OF CORRECTION

PATENT NO. : 8,332,294 B1  
APPLICATION NO. : 12/061198  
DATED : December 11, 2012  
INVENTOR(S) : Kurt Thearling Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this  
Eleventh Day of November, 2014

Michelle K. Lee  
*Deputy Director of the United States Patent and Trademark Office*